United States Patent
Ruf

(10) Patent No.: US 12,040,691 B2
(45) Date of Patent: Jul. 16, 2024

(54) ELECTRICAL MACHINE COMPRISING A COOLING AND OR LUBRICATING SYSTEM HAVING A WET CHAMBER, MOTOR VEHICLE HAVING AN ELECTRICAL MACHINE

(71) Applicant: AUDI AG, Ingolstadt (DE)

(72) Inventor: Andreas Ruf, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 192 days.

(21) Appl. No.: 17/571,006

(22) Filed: Jan. 7, 2022

(65) Prior Publication Data

US 2022/0231578 A1   Jul. 21, 2022

(30) Foreign Application Priority Data

Jan. 19, 2021   (DE) .................. 102021101049.7

(51) Int. Cl.
| | |
|---|---|
| *H02K 9/28* | (2006.01) |
| *B60K 1/00* | (2006.01) |
| *H02K 9/19* | (2006.01) |

(52) U.S. Cl.
CPC ............. *H02K 9/28* (2013.01); *B60K 1/00* (2013.01); *H02K 9/19* (2013.01); *B60K 2001/006* (2013.01)

(58) Field of Classification Search
CPC . H02K 9/19; H02K 9/28; H02K 7/116; B60K 1/00; B60K 11/02; B60K 2001/006; B60Y 2306/03
USPC ...................................... 310/156.29
See application file for complete search history.

(56) References Cited

U.S. PATENT DOCUMENTS

| | | | |
|---|---|---|---|
| 2,706,260 A * | 4/1955 | Heintz | H02K 9/19 |
| | | | 464/17 |
| 3,316,519 A | 4/1967 | Maytone | |
| 4,241,271 A | 12/1980 | Johnson et al. | |
| 5,158,152 A * | 10/1992 | Nemoto | F16N 7/40 |
| | | | 184/6.12 |
| 5,338,618 A | 8/1994 | Suzuki et al. | |

(Continued)

FOREIGN PATENT DOCUMENTS

| | | | |
|---|---|---|---|
| DE | 101 13 673 A1 | 10/2001 | |
| DE | 10316752 A1 * | 10/2004 | H01R 39/14 |

(Continued)

OTHER PUBLICATIONS

Translation of foreign document DE 10316752 A1 (Year: 2004).*

(Continued)

*Primary Examiner* — Alex W Mok
(74) *Attorney, Agent, or Firm* — Maier & Maier, PLLC

(57) ABSTRACT

An electrical machine, in particular for driving a motor vehicle, including a cooling and/or lubricating system having a wet chamber for accommodating a cooling and/or lubricating medium. A stator and/or a rotor of the electrical machine is at least partially arranged in the wet chamber and/or delimits it, and the electrical machine includes at least one stator-side transmission component and at least one rotor-side transmission component, which form an electrical sliding contact. At least one of the transmission components is at least partially arranged in the wet chamber and/or delimits

16 Claims, 3 Drawing Sheets

(56) References Cited

U.S. PATENT DOCUMENTS

| | | | | |
|---|---|---|---|---|
| 6,513,609 B2* | 2/2003 | Hasegawa | ........... | F16H 57/0489 |
| | | | | 903/952 |
| 6,569,054 B2* | 5/2003 | Kato | ..................... | B60K 6/365 |
| | | | | 903/952 |
| 7,847,463 B2* | 12/2010 | Fujita | .................. | H02K 21/044 |
| | | | | 310/156.66 |
| 9,217,708 B2* | 12/2015 | Yanagita | ................ | H02K 13/00 |
| 2001/0023790 A1* | 9/2001 | Hasegawa | ........... | F16H 57/0421 |
| | | | | 903/952 |
| 2010/0236845 A1* | 9/2010 | Ishii | ..................... | B60K 7/0007 |
| | | | | 74/606 R |
| 2013/0234543 A1* | 9/2013 | Buttner | ................ | B60L 3/0061 |
| | | | | 310/54 |
| 2017/0057489 A1* | 3/2017 | Schaefer | ................ | F16H 3/089 |
| 2018/0166844 A1* | 6/2018 | Maier | .................. | H02K 13/003 |
| 2020/0331343 A1* | 10/2020 | Takahashi | .............. | H02K 21/22 |

FOREIGN PATENT DOCUMENTS

| | | |
|---|---|---|
| DE | 10 2010 002 089 A1 | 8/2011 |
| DE | 10 2019 207 787 A1 | 12/2020 |
| JP | 2001080567 A * | 3/2001 |

OTHER PUBLICATIONS

English Abstract of foreign document JP 2001080567 A (Year: 2001).*

Office Action issued Aug. 24, 2021 in German Patent Application No. 10 2021 101 049.7; with English translation; 7 pgs.

* cited by examiner

ELECTRICAL MACHINE COMPRISING A COOLING AND OR LUBRICATING SYSTEM HAVING A WET CHAMBER, MOTOR VEHICLE HAVING AN ELECTRICAL MACHINE

CROSS-REFERENCE TO RELATED APPLICATIONS

This application claims the benefit of priority under 35 U.S.C. § 119 from German Patent Application No. 102021101049.7, filed Jan. 19, 2021.

FIELD

The invention relates to an electrical machine, in particular for driving a motor vehicle, comprising a cooling and/or lubricating system having a wet chamber for accommodating a cooling and/or lubricating medium, wherein a stator and/or a rotor of the electrical machine is at least partially arranged in the wet chamber and/or delimits it, wherein the electrical machine comprises at least one stator-side transmission component and at least one rotor-side transmission component, which form an electrical sliding contact. The invention additionally relates to a motor vehicle.

BACKGROUND

Electrical machines known from the prior art, which are used, for example, for the propulsion of a motor vehicle, comprise a stator and a rotor. During operation of a corresponding electrical machine, heat typically arises, namely, on the one hand, due to the friction occurring in the context of the rotation, on the other hand due to the electrical currents present in the electrical machine or the electric motor. The necessity thus results of both lubricating components rotating in relation to one another, such as the stator or rotor, respectively, and also cooling further components of the electrical machine which heat up in conjunction with the existing electrical currents, for example field coils. For this purpose, a wet chamber is typically provided, in the region of which the components to be lubricated or cooled, respectively, can come into contact with a cooling and/or lubricating medium, which can in particular be oil.

A further aspect of corresponding electrical machines relates to the requirement that electrical currents are transmitted between rotating components and fixed components, thus in particular between stator-side and rotor-side components, for example between a field coil and a control electronics unit or an exciter module, respectively. This transmission typically takes place with the aid of an electrical sliding contact which is implemented, for example, by means of a slip ring and a brush. The components relating to the sliding contact are often arranged in a dry chamber which is insulated in relation to the external surroundings. This prevents the slip ring and the brush from coming into contact with contaminants from the outside, whereby possible appearances of wear can be kept as minor as possible, for example.

Such an electrical machine having an oil-cooled and oil-lubricated stator and rotor is known, for example, from U.S. Pat. No. 4,241,271 A. In this system, a slip ring and a brush are provided for transmitting electrical currents, which are arranged in a dry chamber and form an electrical sliding contact.

Alternatively to the concept that the components forming the electrical sliding contact are arranged in a dry chamber, the possibility is known from the prior art of incorporating these components into a cooling system provided separately for this purpose, in which a coolant circulates. Such a system, in which water is provided as the coolant, for example, is known from U.S. Pat. No. 3,316,519 A, which relates to a gas turbine operable at high speeds.

The problem often results in systems known from the prior art that an installation of the chamber in which the components forming the electrical sliding contact are arranged is only implementable with a high level of technical expenditure. It is problematic here in particular that a reliable insulation between rotating and nonrotating surfaces has to be present, which is often implemented by means of radial shaft seal rings. The components required in this context cause an increased space requirement, so that, for example, the dimensions of the electrical machine increase in the axial direction by multiple centimeters, for example, by approximately 25 mm. Moreover, these additional components cause an increase of the total weight of the electrical machine by multiple kilograms, for example, by approximately 4 kg.

SUMMARY

The present invention has the object of specifying an electrical machine improved in relation thereto.

This object is achieved in the case of an electrical machine of the type mentioned at the outset in that at least one of the transmission components is at least partially arranged in the wet chamber and/or delimits it.

The invention is based on the concept that both the components which form the electrical sliding contact and also the stator and/or the rotor are arranged in the common wet chamber or delimit it in such a way that the cooling and/or lubricating medium is usable in a synergetic manner for cooling or lubricating the stator and/or the rotor and also the sliding contact. In other words, a wet chamber in which the stator and/or rotor is at least partially arranged and/or which the stator and/or rotor delimits, and a rotor in which at least one of the transmission components is at least partially arranged and/or which at least one of the transmission components delimits are combined to form the common wet chamber. In relation to electrical machines from the prior art, in which, in addition to the wet chamber, in which the stator and/or rotor is at least partially arranged and/or which the stator and/or rotor delimits, a dry chamber is provided, in which at least one of the transmission components is at least partially arranged and/or which at least one of the transmission components delimits, in the electrical machine according to the invention, the requirement of the dry chamber is dispensed with entirely, since the stator and/or rotor and at least one of the transmission components is at least partially arranged in the common wet chamber or the common wet chamber is delimited by the stator and/or rotor and at least one of the transmission components, respectively. Due to the common wet chamber, the necessity for insulation elements for sealing a separate chamber, in which at least one of the transmission components is at least partially arranged and/or which at least one of the transmission components delimits, is dispensed with.

The wet chamber can be understood as a spatial section or region designed to be coherent and fluid-tight within the electrical machine, in which the cooling and/or lubricating medium is accommodated or can be accommodated. The wet chamber can thus comprise a spatial section in which the stator and/or rotor is at least partially arranged and/or which the stator and/or rotor delimits, and a spatial section in which at least one of the transmission components is at least partially arranged and/or which at least one of the transmission components delimits, wherein the spatial sections are either connected to one another or form a common spatial section. The electrical machine can have a housing which delimits the wet chamber provided as a cavity at least in sections.

The electrical machine can be an electric motor for the drive or propulsion of the motor vehicle. The rotor can be fixedly connected to a shaft of the electrical machine, so that the rotor and the shaft rotate jointly around a rotational axis, wherein the stator extends radially around the rotor. In this case, the electrical machine forms a so-called internal rotor motor. Alternatively, the rotor can also extend radially around the stator, which is arranged centrally with respect to the rotational axis, so that the electrical machine forms an external rotor motor. The electrical machine is typically operated by means of energy stored in an electrical energy storage device of the motor vehicle.

With respect to the sliding contact, the stator-side transmission component and the rotor-side transmission component are provided. The transmission components are in touch contact with one another here, so that during a rotation of the rotor, the transmission components or corresponding sections of the transmission components slide along one another, so that the touch contact between these components, by means of which the electrical contacting is formed, is also maintained during the operation of the electrical machine. The electrical sliding contact is used in particular to energize rotor-side field coils or to tap currents induced in the field coils. The electrical machine can moreover have at least one permanent magnet in addition to the field coils acting as electromagnets.

With respect to the constructive design of the electrical machine, it can be provided that a rotor position encoder is provided on the end face of the housing, by means of which the rotor or the shaft, respectively, is held in position. The rotor position encoder, in which the rotating component is mounted by means of a ball bearing or the like, for example, can be held in position here by a bearing plate of the housing. The electrical machine is preferably terminated fluid-tight by means of a housing cover on the end face.

The stator and/or the rotor and also the transmission components can be arranged in the wet chamber, so that the complete surfaces of these components come into contact with the cooling and/or lubricating medium. Alternatively, these components can be arranged at least partially or at least in sections in the wet chamber. That is to say, these components protrude partially into the wet chamber, so that at least a part of the surfaces thereof come into contact with the cooling and/or lubricating medium. Moreover, these components can at least partially delimit the wet chamber. That is to say, at least a part of the surface of these components delimits the wet chamber to the outside or forms a corresponding wall of the wet chamber, respectively. In summary, the walls delimiting the wet chamber can be formed by the stator and/or the rotor and/or the stator-side transmission component and/or the rotor-side transmission component and/or the inner wall of the housing and/or further components of the electrical machine.

It is preferably provided in the electrical machine according to the invention that the stator-side transmission component is a brush and the rotor-side transmission component is a slip ring. This type of the sliding contact has proven to be extremely advantageous and reliable in the field of electrical machines. The brush can thus be fastened on the stator fixed in place with respect to the electrical machine and can have electrically conductive brush bristles or wires fastened on a brush holder. The slip ring, which is also electrically conductive, is arranged concentrically around the rotational axis here and fastened on the rotor or the shaft, respectively, wherein the brush bristles or wires are pressed due to their bending elasticity against the slip ring and thus the touch contact and therefore the electrical contact is formed.

The slip ring particularly preferably consists of a steel alloy and the brush of a material free of nonferrous metals, namely a metal or an alloy, in particular a silver alloy. The term "free of nonferrous metals" means that the corresponding material does not contain nonferrous metals such as copper or the like. The corresponding material pair preferably has good compatibility with respect to preferred cooling and/or lubricating media such as oil, whereby the longest possible lifetime of the slip ring and the brush is ensured.

The cooling and/or lubricating system can be able to be incorporated or can be incorporated in a cooling and/or lubricating circuit of the motor vehicle in which the cooling and/or lubricating medium circulates. The cooling and/or lubricating medium can be an oil for this purpose, which has particularly positive properties with respect to the cooling or lubricating effect, respectively. The oil can be introduced, in particular sprayed, into the wet chamber by means of an oil lance. The oil lance can extend along the rotational axis through a recess of the stator or rotor, respectively, and the shaft connected thereto. A nozzle can be provided in the region of the outlet opening of the oil lance, which protrudes into the region of the wet chamber, in which in particular the transmission components are arranged, so that they are consistently and reliably cooled or lubricated, respectively. To introduce the cooling and/or lubricating medium into the wet chamber, the opening or nozzle of the oil lance can be arranged in the recess extending in the longitudinal direction of the stator or rotor or the shaft connected thereto, wherein the cooling and/or lubricating medium reaches the wet chamber, for example, via radial recesses or drilled holes of this component. In particular, the rotation of the rotating components causes the cooling and/or lubricating medium to be distributed uniformly in the wet chamber.

The cooling and/or lubricating circuit of the motor vehicle can comprise an oil reservoir from which oil can be introduced into the wet chamber by means of a supply line. The oil can be introduced here by the supply line into the oil lance. The oil can be able to be guided back to the oil reservoir from the wet chamber via a corresponding return line to close the cooling and/or lubricating circuit. An oil pump of the cooling and/or lubricating circuit can be provided in each case in the region of the supply line and/or the return line.

The electrical machine can comprise a transmission, which is connectable or connected to a component of a drivetrain of the motor vehicle, wherein at least one component of the transmission is at least partially arranged in the wet chamber or delimits it. The wet chamber can thus, in addition to the section in which the stator and/or the rotor is at least partially arranged and/or which the stator and/or rotor delimits, and the section in which at least one of the transmission components is at least partially arranged and/or which at least one of the transmission components delimits, additionally comprise a section in which at least one component of the transmission is at least partially arranged and/or which at least one component of the transmission delimits, wherein these sections are either connected to one another or form a common section. In this embodiment, the cooling and/or lubricating system is not only used for cooling or lubricating, respectively, the stator/rotor of the electrical machine and the transmission components, but moreover the component of the transmission, in particular at least one gearwheel of the transmission.

The drivetrain is used to transmit the torque generated by the electrical machine to the wheels of the motor vehicle. The drivetrain comprises further components such as corresponding differentials, universal shafts, and the like. The transmission, which is preferably arranged at least partially inside the housing of the electrical machine, can be connectable or connected on the drive side to the rotor or the shaft and can be connectable or connected on the output side to a shaft of the drivetrain of the motor vehicle, wherein a speed conversion takes place between these components by means of the transmission. The transmission can be, for example, a coaxial transmission, in particular a planetary gear. In this case, the drive-side shaft or the rotor and the output-side shaft of the drivetrain are on the same rotational axis with respect to the transmission. The electrical machine is preferably an externally excited synchronous machine, wherein an exciter module is provided for energizing at least one rotor-side field coil, wherein an electrical connection is formed or can be formed between the exciter module and the at least one rotor-side field coil by means of the electrical sliding contact. The externally excited synchronous machine enables a continuous speed regulation, wherein for this purpose the exciter module is assigned to a corresponding power electronics unit or is electrically connected thereto, respectively.

The exciter module can be connected by means of a suitable electrical connecting means, for example, by means of an exciter current cable, to the stator-side transmission component, in particular the brush. The rotor-side transmission component, in particular the slip ring, can also be connected by means of a suitable electrical connecting means, for example, by means of a cable, to the rotor-side field coil. Finally, the rotor-side field coil is activatable via the sliding contact and the electrical connecting means by the exciter module or the power electronics unit, respectively. The object of the present invention is additionally achieved by means of a motor vehicle having an electrical machine according to the above description. All advantages and features of the electrical machine according to the invention are transferable here to the motor vehicle according to the invention and vice versa.

BRIEF DESCRIPTION OF THE FIGURES

Further advantages and details of the present invention result from the exemplary embodiments described hereinafter and on the basis of the figures. In the schematic figures.

DETAILED DESCRIPTION

Figure 1:
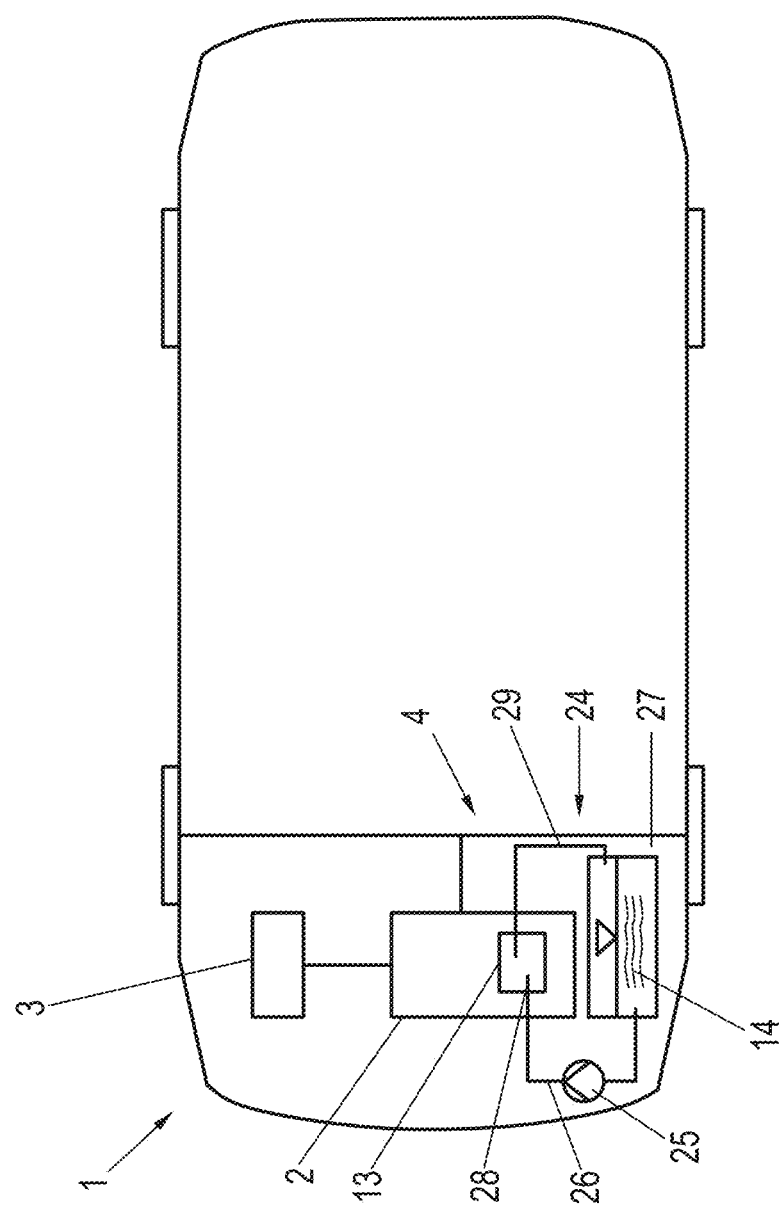
FIG. 1 shows a motor vehicle according to the invention having an electrical machine according to the invention.

FIG. 1 shows a motor vehicle 1 according to the invention comprising an electrical machine 2 according to the invention. The electrical machine 2 is designed in the present case as an electric motor which is usable by means of energy stored in electrical energy storage device 3 of the motor vehicle 1 for the propulsion of the motor vehicle 1. The electrical machine 2 is connected for this purpose to a drivetrain 4 of the motor vehicle 1, which is only schematically indicated in FIG. 1, without further details such as corresponding differentials, universal shafts, and the like.

Figure 2:
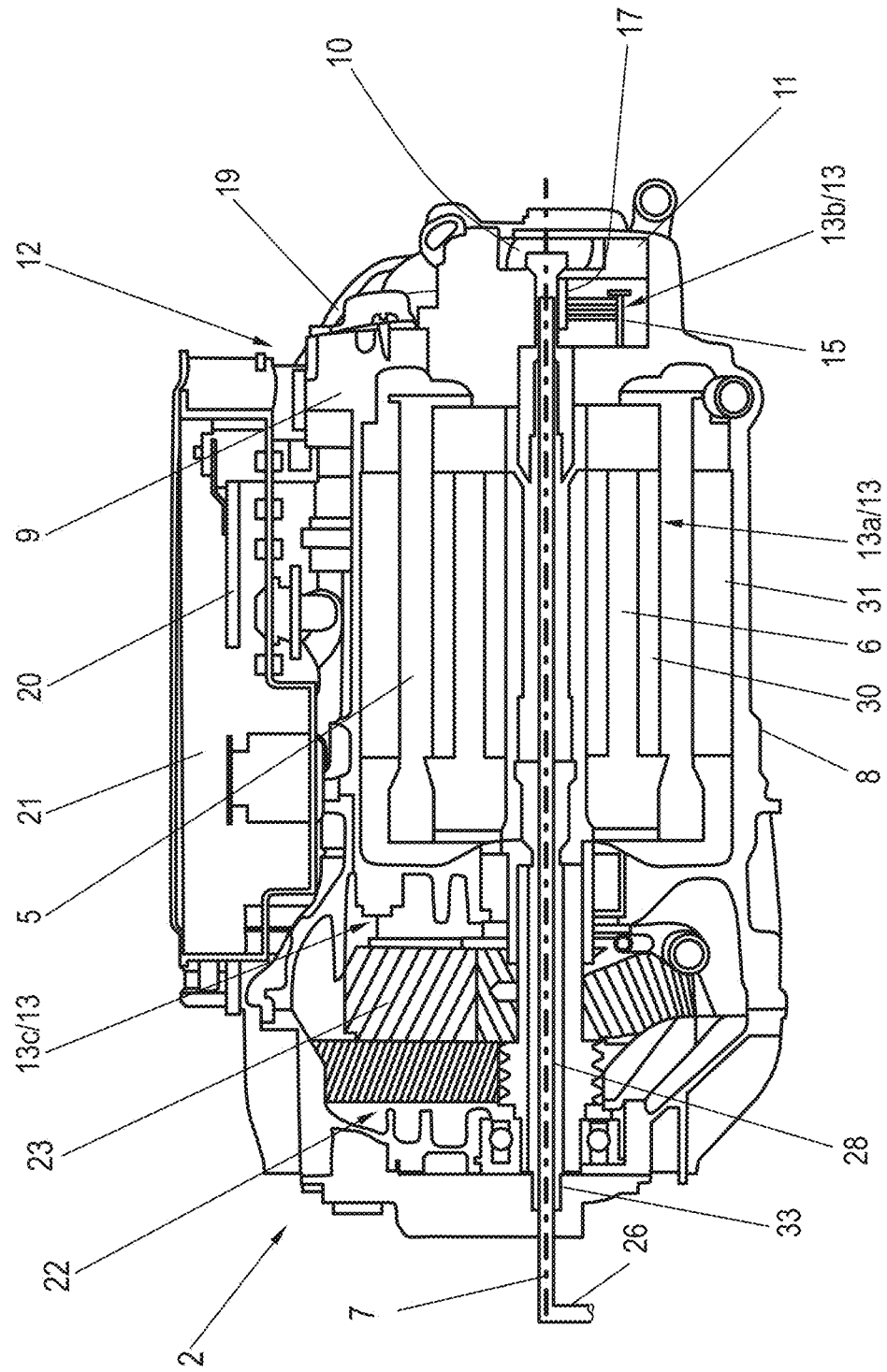
FIG. 2 shows details with respect to the electrical machine of the motor vehicle from FIG. 1.

Details with respect to the electrical machine 2 are shown in FIG. 2. The electrical machine 2 comprises a stator 5 and a rotor 6. The rotor 6 is rotatably mounted around a rotational axis 7 and thus forms an internal rotor motor by way of example. The rotor 6 is connected here to a shaft 33. The electrical machine 2 is terminated to the outside by means of a housing 8, which has a bearing plate 9 on the end face. A rotor position encoder 10 is provided in the region of the bearing plate 9, by means of which the rotor 6 or the shaft 33, respectively, is rotatably held in position, for example by a ball bearing or the like. The housing 8 is closed on the end face by a housing cover 11.

The electrical machine 2 comprises a cooling and/or lubricating system 12, by means of which the stator 5 and the rotor 6 can be cooled and lubricated. The cooling and/or lubricating system 12 comprises a wet chamber 13. The stator 5 and the rotor 6 are arranged in a first spatial section 13a of the wet chamber 13, wherein it can similarly be provided that the stator 5 and/or the rotor 6 delimits the first section 13a. A cooling and/or lubricating medium 14, in the present case an oil, for cooling or lubricating these components, respectively, is introducible or introduced into the wet chamber 13. The cooling of the stator 5 and the rotor 6 primarily takes place here by means of the cooling and/or lubricating medium 14 present in a gap between the stator 5 and the rotor 6 and in a gap between the stator 6 and the inner wall of the housing 8.

Figure 3:
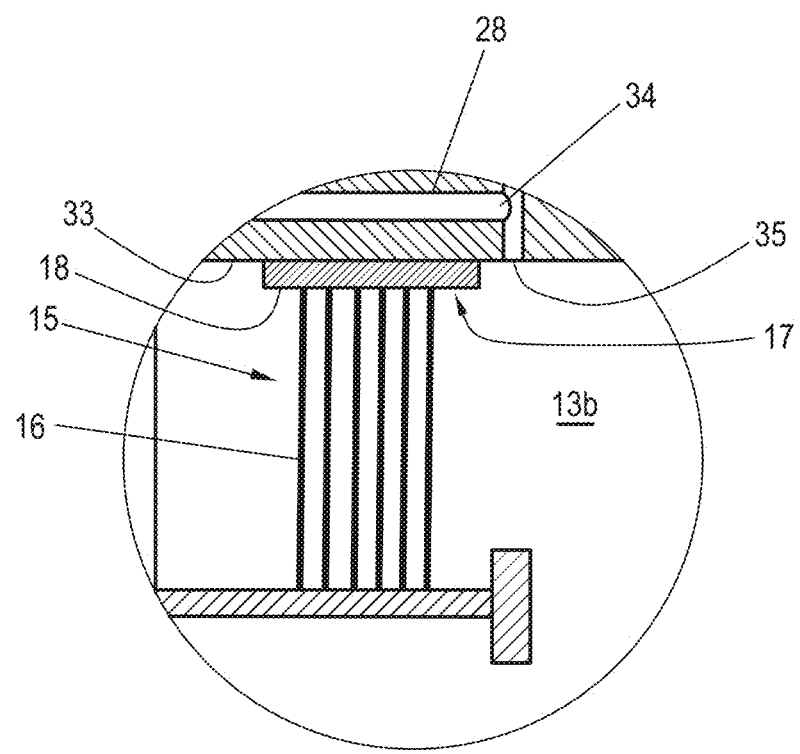
FIG. 3 shows an enlarged view of a sliding contact of the electrical machine shown in FIG. 2.

The electrical machine 2 furthermore comprises a stator-side transmission component 15, namely a brush 16, and a rotor-side transmission component 17, namely a slip ring 18. The transmission components 15, 17 form an electrical sliding contact, which is shown enlarged in FIG. 3. Specifically, the rotor-side transmission component 17 is connected via electrical contacting means (not shown in greater detail), to rotor-side field coils 30. The stator-side transmission component 15 is in turn connected via an exciter current cable 19 to an exciter module 20 or a power electronics unit 21, respectively. The electrical machine 2 is specifically designed as an externally excited synchronous machine, in which a continuous speed regulation is possible by means of the rotor-side field coils 30 and stator-side field coils 31. Alternatively, permanent magnets can similarly be provided instead of the stator-side field coils.

The transmission components 15, 17 are also arranged in the wet chamber 13, namely in a second spatial section 13b of the wet chamber 13. It can similarly be provided that at least one of the transmission components 15, 17 delimits the second section 13b. The first section 13a and the second section 13b of the wet chamber 13 are connected to one another here in such a way that the cooling and/or lubricating medium 14 is used both for cooling or lubricating, respectively, the stator 5 and the rotor 6 and also the brush 16 and the slip ring 18. The cooling and/or lubricating medium 14 is distributed uniformly in the wet chamber 13 here due to the rotation of the corresponding components, such as the rotor 6, the shaft 33, and the slip ring 18.

To ensure the best possible material compatibility between the cooling and/or lubricating medium 14 and the transmission components 15, 17, it is provided by way of example that the slip ring 18 consists of a steel alloy and the brush 16 consists of a material free of nonferrous metals. The material free of nonferrous metals is a metal or an alloy, respectively, in the present case a silver alloy. This material selection avoids corrosion occurring on the brush 16 or the slip ring 18, respectively, which would occur if the brush 16 would have nonferrous metals or the slip ring 18 were to consist of a bronze alloy.

The electrical machine 2 furthermore comprises a transmission 22, in the present case a coaxial transmission, which is connected to a shaft (not shown in greater detail) of the drivetrain 4. The rotational axis of the transmission 22 coincides here with the rotational axis 7 of the rotor 6. A component 23 of the transmission 22, namely a gearwheel, is also arranged in the wet chamber 13, namely in a third spatial section 13c of the wet chamber 13, which is connected to the sections 13a, 13b. It can similarly be provided that a component 23 of the transmission 22 delimits the third section 13c. The cooling and/or lubricating medium 14 is therefore also used for cooling and lubricating the transmission 22.

The cooling and lubricating system 12 of the electrical machine 2 is incorporated according to FIG. 1 in a cooling and/or lubricating circuit 24 of the motor vehicle, in which the cooling and/or lubricating medium 14 circulates. The cooling and/or lubricating medium 14 is introduced here by means of a pump 25 via a supply line 26 from an oil reservoir 27 into the wet chamber 13. For this purpose, the supply line 26 is connected to an oil lance 28 of the cooling and lubricating system 12, so that cooling and/or lubricating medium 14 is sprayed via the oil lance 28 into the spatial section 13b of the wet chamber 13. The oil lance 28 extends for this purpose from the outside into the housing 8 and along the rotational axis 7 through a central drilled hole of the rotor 6, wherein the oil lance 28 has a nozzle 34 on the end face for the introduction into the second section 13b.

The cooling and/or lubricating medium 14 is introduced here, for example, via radial recesses or drilled hole 35 of the shaft 33 into the second section 13b. The most uniform possible distribution of the cooling and/or lubricating medium 14 inside the wet chamber 13 takes place due to the rotation of rotating components, in particular the rotor 6 and the rotor-side transmission component 17 or the slip ring 18, respectively. The return of the cooling and/or lubricating medium 14 from the wet chamber 13 to the oil reservoir 27 takes place via a corresponding return line 29 and possibly a further oil pump provided in the region of the return line.

The invention claimed is:

1. An electrical machine configured to drive a motor vehicle, comprising:
   a cooling and/or lubricating system having a wet chamber with connected first and second spatial sections for accommodating a cooling and/or lubricating medium, wherein a stator and a rotor of the electrical machine are arranged in the first spatial section of the wet chamber;
   at least one stator-side transmission component and at least one rotor-side transmission component, which form an electrical sliding contact, wherein the transmission components are arranged in the second spatial section of the wet chamber and a gearwheel delimits a third spatial section of the wet chamber.

2. The electrical machine as claimed in claim 1, wherein the stator-side transmission component is a brush and the rotor-side transmission component is a slip ring.

3. The electrical machine as claimed in claim 2, wherein the slip ring consists of a steel alloy and the brush consists of an electrically conductive material free of nonferrous metals.

4. The electrical machine as claimed in claim 3, wherein the cooling and/or lubricating system is configured to be incorporated in a cooling and/or lubricating circuit of the motor vehicle, in which an oil circulates.

5. The electrical machine as claimed in claim 3, wherein the electrical machine comprises a coaxial transmission, which is configured to be connected to a component of a drivetrain of the motor vehicle and at least one component of the transmission is at least partially arranged in the wet chamber.

6. The electrical machine as claimed in claim 3, wherein the electrical machine is an externally excited synchronous machine, an exciter module is configured to energize at least one rotor-side field coil, and an electrical connection between the exciter module and the at least one rotor-side field coil is configured to be formed by means of the electrical sliding contact.

7. The electrical machine as claimed in claim 2, wherein the cooling and/or lubricating system is configured to be incorporated in a cooling and/or lubricating circuit of the motor vehicle, in which an oil circulates.

8. The electrical machine as claimed in claim 2, wherein the electrical machine comprises a coaxial transmission, which is configured to be connected to a component of a drivetrain of the motor vehicle and at least one component of the transmission is at least partially arranged in the wet chamber.

9. The electrical machine as claimed in claim 2, wherein the electrical machine is an externally excited synchronous machine, an exciter module is configured to energize at least one rotor-side field coil, an electrical connection between the exciter module and the at least one rotor-side field coil is configured to be formed by means of the electrical sliding contact.

10. The electrical machine as claimed in claim 1, wherein the cooling and/or lubricating system is configured to be incorporated in a cooling and/or lubricating circuit of the motor vehicle, in which an oil circulates.

11. The electrical machine as claimed in claim 10, wherein the electrical machine comprises a coaxial transmission, which is configured to be connected to a component of a drivetrain of the motor vehicle and at least one component of the transmission is at least partially arranged in the wet chamber.

12. The electrical machine as claimed in claim 10, wherein the electrical machine is an externally excited synchronous machine, an exciter module is configured to energize at least one rotor-side field coil, and an electrical connection between the exciter module and the at least one rotor-side field coil is configured to be formed by means of the electrical sliding contact.

13. The electrical machine as claimed in claim 1, wherein the electrical machine comprises a coaxial transmission, which is configured to be connected to a component of a drivetrain of the motor vehicle, and at least one component of the transmission is at least partially arranged in the wet chamber.

14. The electrical machine as claimed in claim 13, wherein the electrical machine is an externally excited synchronous machine, an exciter module is configured to energize at least one rotor-side field coil, and an electrical connection between the exciter module and the at least one rotor-side field coil is configured to be formed by means of the electrical sliding contact.

15. The electrical machine as claimed in claim 1, wherein the electrical machine is an externally excited synchronous machine, an exciter module is configured to energize at least one rotor-side field coil, and an electrical connection between the exciter module and the at least one rotor-side field coil is configured to be formed by means of the electrical sliding contact.

16. The electrical machine as claimed in claim 1, wherein the electrical machine is configured as a motor for the motor vehicle.

\* \* \* \* \*